W. McKAY.
PUNCTURE PROOF TIRE.
APPLICATION FILED MAY 16, 1911. RENEWED MAY 24, 1912.
1,048,423.
Patented Dec. 24, 1912.
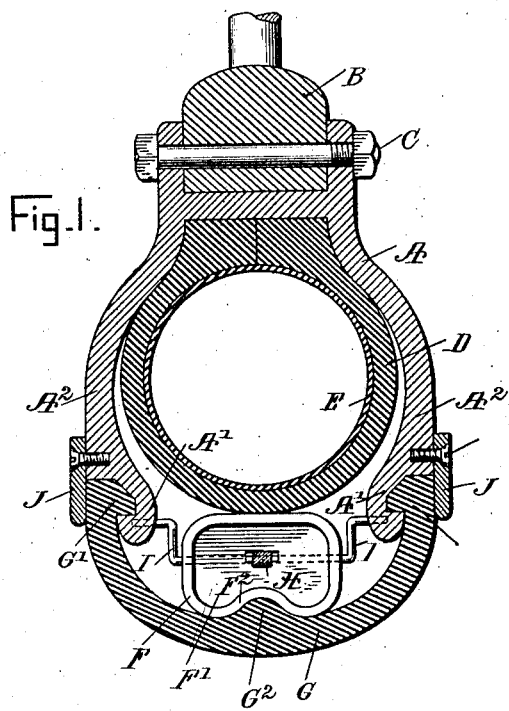
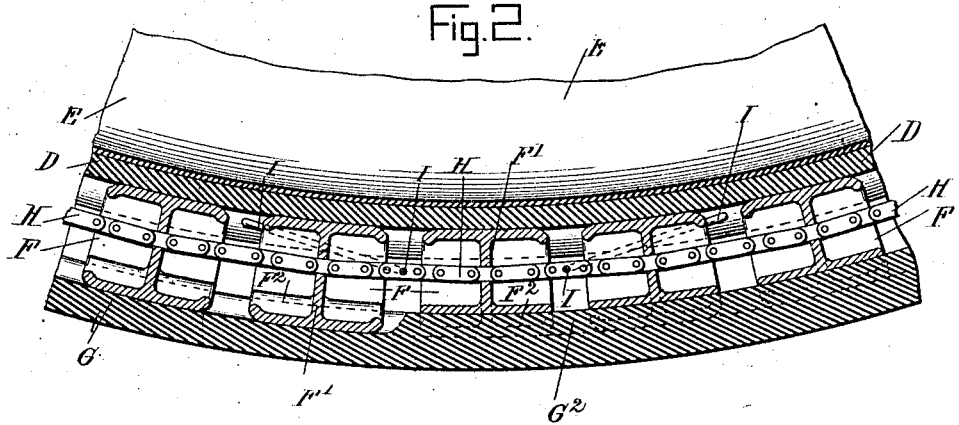
WITNESSES
INVENTOR
William McKay
BY
ATTORNEYS

UNITED STATES PATENT OFFICE.

WILLIAM McKAY, OF NEW YORK, N. Y., ASSIGNOR OF ONE-TWENTIETH TO IRWIN G. BURTON, OF NEW YORK, N. Y.

PUNCTURE-PROOF TIRE.

1,048,423.  Specification of Letters Patent.  Patented Dec. 24, 1912.

Application filed May 16, 1911, Serial No. 627,475. Renewed May 24, 1912. Serial No. 699,538.

*To all whom it may concern:*

Be it known that I, WILLIAM McKAY, a subject of the King of Great Britain, and a resident of the city of New York, borough of Manhattan, in the county and State of New York, have invented a new and Improved Puncture-Proof Tire, of which the following is a full, clear, and exact description.

The invention relates to tires having an inner inflatable tube, and its object is to provide a new and improved puncture-proof tire which is simple and durable in construction, cheap to manufacture, and arranged to permit convenient assembling of the parts, and to protect the inner tube against being punctured by tacks or the like, at the same time producing the desired cushioning effect of the ordinary inner tube tire.

For the purpose mentioned, use is made of a tread, an inner tube inclosed in a shoe, and separators interposed between the said shoe and tread.

A practical embodiment of the invention is represented in the accompanying drawings forming a part of this specification, in which similar characters of reference indicate corresponding parts in both views.

Figure 1 is a cross section of the tire; and Fig. 2 is a sectional side elevation of the same.

A metallic casing A is secured to the wheel rim B by transverse bolts C, and into the outer open portion of the said metallic casing A fits a rubber shoe or covering D, inclosing an inner inflatable tube E to give the desired cushioning effect to the tire. The outer peripheral face of the shoe D rests on spaced metallic separators F, engaging with their outer faces the inner surface of a tread G, of rubber or other flexible material, the tread G being segmental in cross section and terminating at the sides in hooks G′ adapted to hook onto corresponding hooks A′ formed on the outer edges of the sides $A^2$ of the casing A, as will be readily understood by reference to Fig. 1. The separators F are preferably hollow or tubular in a longitudinal direction, and each is provided with a transverse partition F′, engaged at or near its middle by a chain H, which serves to hold the separators spaced apart, at the same time flexibly connecting the separators with each other, so as to allow each separator to act independently of the adjacent one when under a load.

In order to prevent lateral displacement of the separators F, each is provided in its outer face with a longitudinally-extending recess $F^2$, into which fits a correspondingly-shaped rib $G^2$ formed integrally on the inner surface of the tread G, the said rib G holding the separators F against transverse movement.

In order to prevent longitudinal shifting of the separators F and their connecting chain H, use is made of yokes I connected with links intermediate adjacent separators F, and attached to the hooks A′ of the casing A, as plainly indicated in the drawings.

The joints between the hooks G′, A′ of the tread G and casing A are covered exteriorly by metallic rings J fastened by screws or other fastening devices to the sides $A^2$ of the casing A.

By the use of the separators F, the tread G is separated from the shoe D and the inner tube E a sufficient distance so that tacks, pins or the like passing through the tread G are not liable to reach the shoe D and the inner tube E, and hence the danger of puncturing the inner tube is reduced to a minimum.

The shoe D is split and the split portion is enlarged to fit snugly into the casing A, as plainly indicated in Fig. 1.

The casing A may be made in sections fastened together so as to permit convenient placing of the shoe D and the inner tube E in position in the casing when assembling the parts.

The puncture-proof tire is formed of comparatively few parts, which can be readily assembled, and convenient access can be had to the parts by removing one of the rings J and unhooking the corresponding side of the tread G.

Having thus described my invention, I claim as new and desire to secure by Letters Patent:

1. A puncture-proof tire, comprising an inflatable inner tube, a shoe for the same, a tread, separators interposed between the said shoe and the said tread, and a flexible connection for the said separators to hold the same permanently spaced apart in the tire.

2. A puncture-proof tire, comprising an inner inflatable tube, a split shoe inclosing the said tube, a flexible tread, metallic separators interposed between the said shoe and the said tread, the said separators being spaced apart and made hollow, each separator having an interior transverse partition, and a chain engaging the said partitions to hold the separators spaced apart.

3. A puncture-proof tire, comprising an inner inflatable tube, a shoe inclosing the said tube, a flexible tread, separators interposed between the said shoe and the said tread, and spaced apart, a chain connecting the separators in a circular series, and supporting-members engaging the chain to prevent longitudinal movement thereof.

4. A puncture-proof tire, comprising an inner inflatable tube, a shoe inclosing the said tube, a flexible tread, separators interposed between the said shoe and the said tread, the said separators being spaced apart and made hollow, each separator having an interior transverse partition, a chain engaging the said partitions to hold the separators spaced apart, and connections for holding said chain and said separators.

5. A puncture-proof tire, comprising a metallic casing having sides, a rubber shoe fitting into the said casing, an inner tube in the said shoe, a rubber tread secured to the said casing sides, spaced metallic separators interposed between the said shoe and the said tread, a chain connecting the separators with each other, and yokes held on the said casing sides and engaging the said chain to hold the latter and the separators against longitudinal movement.

In testimony whereof I have signed my name to this specification in the presence of two subscribing witnesses.

WILLIAM McKAY.

Witnesses:
THEO. G. HOSTER,
PHILIP D. ROLLHAUS.

Copies of this patent may be obtained for five cents each, by addressing the "Commissioner of Patents, Washington, D. C."